(12) United States Patent
Kim et al.

(10) Patent No.: US 7,779,225 B2
(45) Date of Patent: Aug. 17, 2010

(54) MEMORY ACCESS METHOD USING THREE DIMENSIONAL ADDRESS MAPPING

(75) Inventors: Jong Myon Kim, Yongin-si (KR); Soojung Ryu, Cheonan-si (KR); Dong-Hoon Yoo, Suwon-si (KR); Hong-Seok Kim, Seongnam-si (KR); Hee Seok Kim, Seoul (KR); Jeongwook Kim, Sungnam-si (KR); Kyoung June Min, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 11/828,440

(22) Filed: Jul. 26, 2007

(65) Prior Publication Data

US 2008/0209159 A1 Aug. 28, 2008

(30) Foreign Application Priority Data

Feb. 22, 2007 (KR) ...................... 10-2007-0017775

(51) Int. Cl.
*G06F 12/00* (2006.01)
(52) U.S. Cl. ..................................................... 711/202
(58) Field of Classification Search ........................ None
See application file for complete search history.

(56) References Cited

U.S. PATENT DOCUMENTS

| | | | | |
|---|---|---|---|---|
| 4,603,348 A | * | 7/1986 | Yamada et al. | ............... 358/500 |
| 5,293,596 A | * | 3/1994 | Toyokura et al. | ............... 711/1 |

FOREIGN PATENT DOCUMENTS

| | | |
|---|---|---|
| JP | 08-147210 | 6/1996 |
| JP | 2004-013389 A | 1/2004 |
| KR | 10-2005-0022200 A | 3/2005 |
| WO | WO 0190888 A1 * | 11/2001 |

* cited by examiner

*Primary Examiner*—Kevin Verbrugge
(74) *Attorney, Agent, or Firm*—Sughrue Mion, PLLC

(57) ABSTRACT

A memory access method includes: obtaining a, b, and c from a program code for accessing a memory with a triple loop in a program, a being a number of values which an inner-most loop variable of the triple loop may have, b being a number of values which a middle loop variable of the triple loop may have, and c being a number of values which an outer-most loop variable of the triple loop may have; obtaining a starting address of the memory accessed by the triple loop; and obtaining an a×b×c number of addresses of the memory accessed by the triple loop using the starting address and a function.

21 Claims, 11 Drawing Sheets

FIG. 6A

| A0 | A1 | A2 | A3 | A4 | A5 | A6 | A7 | A8 | A9 | A10 | A11 |
|---|---|---|---|---|---|---|---|---|---|---|---|
| (0,0,0) | (0,2,0) | (0,4,0) | (0,6,0) | (2,0,0) | (2,2,0) | (2,4,0) | (2,6,0) | (4,0,0) | (4,2,0) | (4,4,0) | (4,6,0) |

3-D MODULE ARRAY (0,0,0)

FIG. 6B

| | A0 | A1 | A2 | A3 | A4 | A5 | A6 | A7 | A8 | A9 | A10 | A11 |
|---|---|---|---|---|---|---|---|---|---|---|---|---|
| | (0,1,1) | (0,3,1) | (0,5,1) | (0,7,1) | (2,1,1) | (2,3,1) | (2,5,1) | (2,7,1) | (4,1,1) | (4,3,1) | (4,5,1) | (4,7,1) |

3-D MODULE ARRAY (0,1,1)

FIG. 7

MEMORY ACCESS METHOD USING THREE DIMENSIONAL ADDRESS MAPPING

CROSS-REFERENCE TO RELATED APPLICATION

This application claims priority from Korean Patent Application No. 10-2007-0017775, filed on Feb. 22, 2007, in the Korean Intellectual Property Office, the entire disclosure of which is incorporated herein by reference.

BACKGROUND OF THE INVENTION

1. Field of the Invention

Methods and apparatuses consistent with the present invention relate to a memory system, and more particularly, to a method and apparatus for accessing a linear addressable memory (LAM) using a three-dimensional address (3-D) mapping.

2. Description of Related Art

FIG. 1 is a diagram illustrating a case of accessing a memory block according to a related art. When a double loop of 2×2 array exists in a program, an address of a memory accessed by the double loop is not sequential. As illustrated in FIG. 1, four data are included in a block to access 120. In this instance, a linear addressable memory (LAM) is required to access memory at least four times. To reduce the four times of accessing memory, a block access is used. For example, four aligned blocks are interpreted by a single memory access. However, even in this case, when all data to be interpreted is not included in a single aligned block, several memory accesses are still required. In FIG. 1, all data included in the block to access 120 is included in different aligned blocks. For example, an address 23 of the block to access 120 is included in an aligned block 110. In this case, to access all data included in the block to access 120, it is required to access memory four times.

Also, double loops or triple loops occur frequently in many different kinds of programs. Particularly, triple loops are frequently used in a program for video processing. Accordingly, a method and apparatus for efficiently accessing a memory accessed by the triple loop is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for efficiently accessing a memory accessed by a triple loop included in a program.

The present invention also provides a method and apparatus for efficiently mapping a linear address into a 3-D address which is suitable for an address computation of a memory accessed by a triple loop.

According to an aspect of the present invention, there is provided a memory access method, including: obtaining a, b, and c from a program code for accessing a memory with a triple loop in a program, a being a number of values which an inner-most loop variable of the triple loop may have, b being a number of values which a middle loop variable of the triple loop may have, and c being a number of values which an outer-most loop variable of the triple loop may have; obtaining a starting address of the memory accessed by the triple loop; and obtaining a number of addresses of the memory accessed by the triple loop using the starting address and a function, wherein the number of addresses is a×b×c.

According to another aspect of the present invention, there is provided a memory access method, further including: mapping a linear address addr of a memory into a two-dimensional (2-D) address (m, n); mapping the 2-D address (m, n) into a 3-D address (x, y, z); mapping the 3-D address (x, y, z) into a 3-D module (p, q, r); and generating a 3-D module array, (p, q, r) which comprises addresses which are mapped into the 3-D module (p, q, r), the addresses being sorted sequentially.

According to still another aspect of the present invention, there is provided a 3-D address mapping method, including: mapping a linear address addr of a memory into a 2-D address (m, n); and mapping the 2-D address (m, n) into a 3-D address (x, y, z), wherein L is a scan-line length of the memory, m is a quotient of (addr/L), n is a remainder of (addr/L), x=m, y=a quotient of (n/a), z=a remainder of (n/a), and a is a number of values which an inner-most loop variable may have.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which:

FIGS. 6A and 6B are diagrams illustrating an operation of generating a 3-D module array according to an exemplary embodiment of the present invention;

FIG. 7 is a diagram illustrating an operation of obtaining an address of a block including an a×b×c number of data according to an exemplary embodiment of the present invention;

DETAILED DESCRIPTION OF EXEMPLARY EMBODIMENTS

Figure 1:
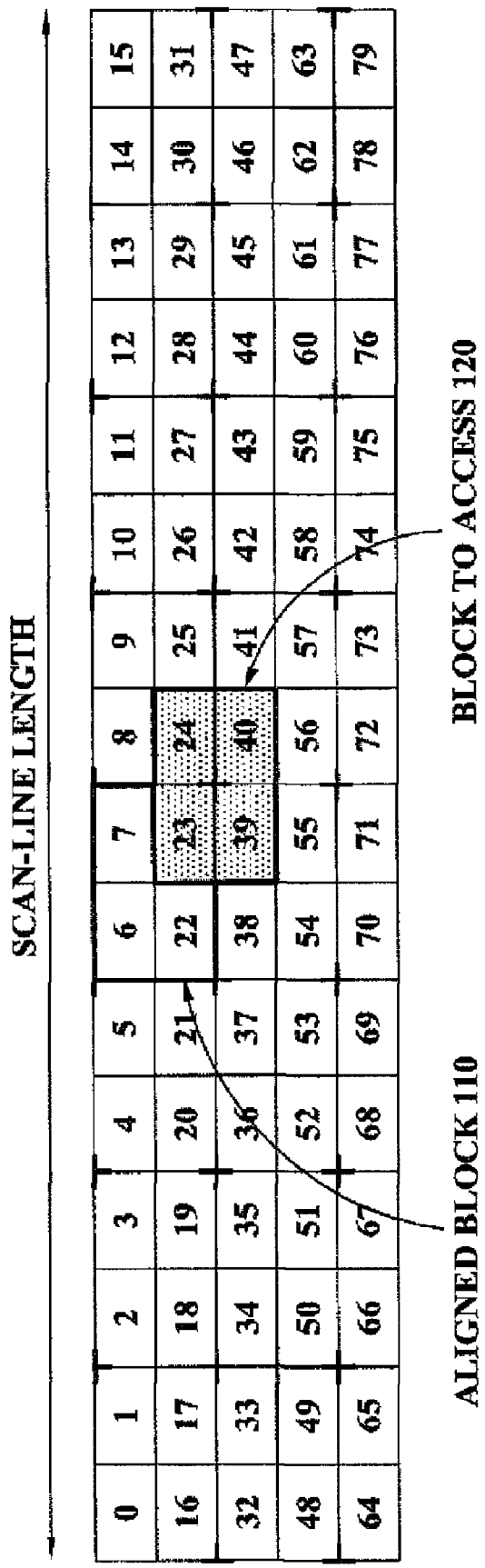
FIG. 1 is a diagram illustrating a case of accessing a memory block according to a related art.

Hereinafter, exemplary embodiments of the present invention will be described in detail with reference to the accompanying drawings, wherein like reference numerals refer to the like elements throughout.

Figure 2:
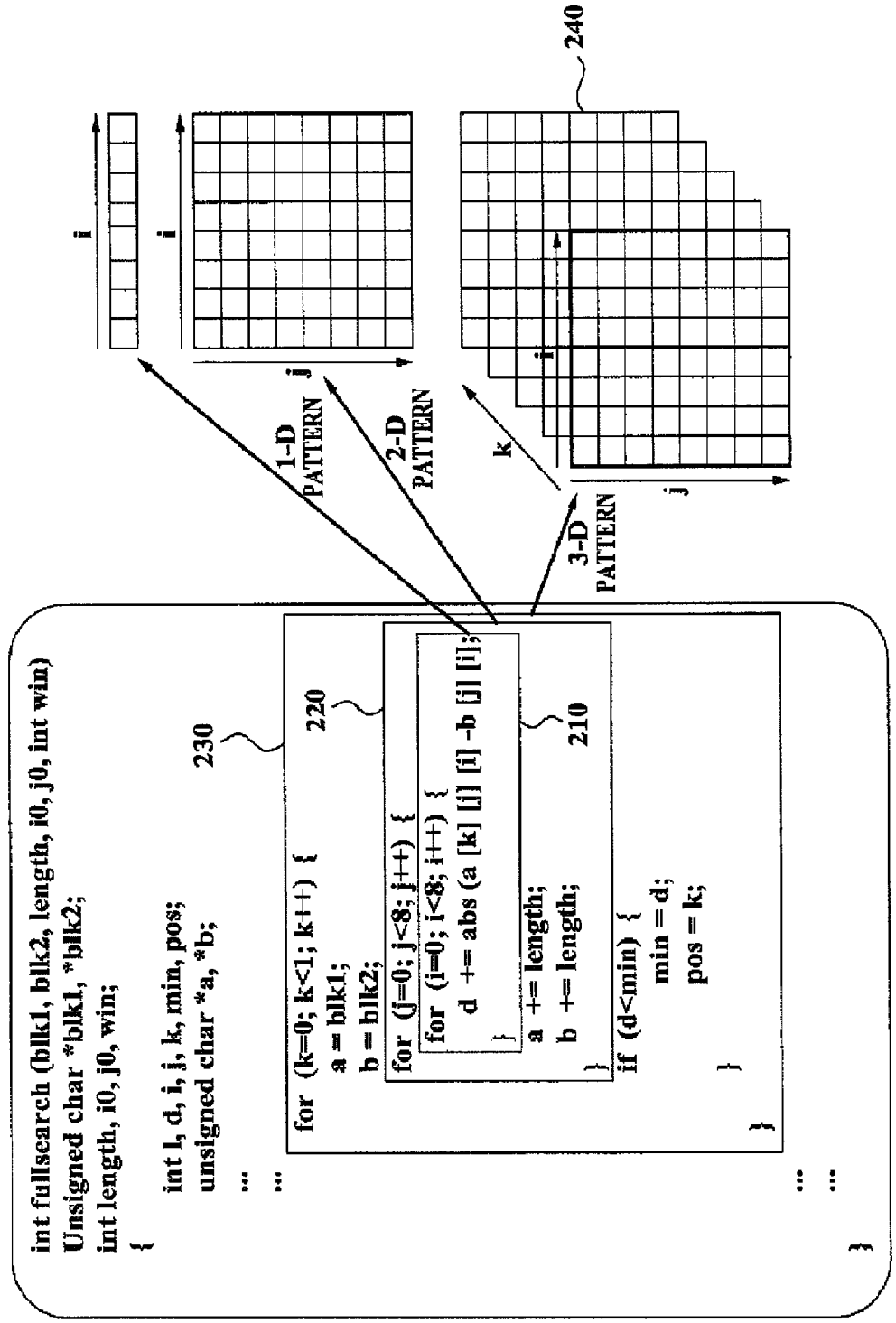
FIG. 2 is a diagram illustrating an example of a program including a triple loop for an exemplary embodiment of the present invention.

FIG. 2 is a diagram illustrating an example of a program including a triple loop for an exemplary embodiment of the present invention.

A function fullsearch( ) illustrated in FIG. 2 is frequently used in a video codec such as a moving picture experts group (MPEG), H.264, and the like. As illustrated in FIG. 2, the function fullsearch( ) has a triple loop. Referring to FIG. 2, when referring to a memory in an inner-most loop 210, the memory has a one-dimensional (1-D) pattern. However, when performing a double loop by including a middle loop 220 and referring to the memory, the memory has a 2-D pattern. Also, when performing the triple loop by including an outer-most loop 230 and referring to the memory, the memory has a 3-D pattern 240. In addition to the function fullsearch( ), video processing programs have other triple loops.

When accessing the memory with the 1-D pattern, sequential memory locations are accessed. However, when accessing the memory with the 2-D pattern or the 3-D pattern, arbitrary memory locations are accessed. In FIG. 2, since a[k][j][i] is accessed with the triple loop, non-sequential memory locations are required to be accessed. The present invention uses a virtually matched 3-D address to efficiently access the memory which is referred to by the triple loop.

In FIG. 2, an inner-most loop variable of the triple loop is i, and a number of values which the inner-most loop variable i may have is 8. A middle loop variable of the triple loop is j, and a number of values which the middle loop variable j may have is 8. Also, an outer-most loop variable of the triple loop is k, and a number of values which the outer-most loop variable k may have is 2.

Figure 3:
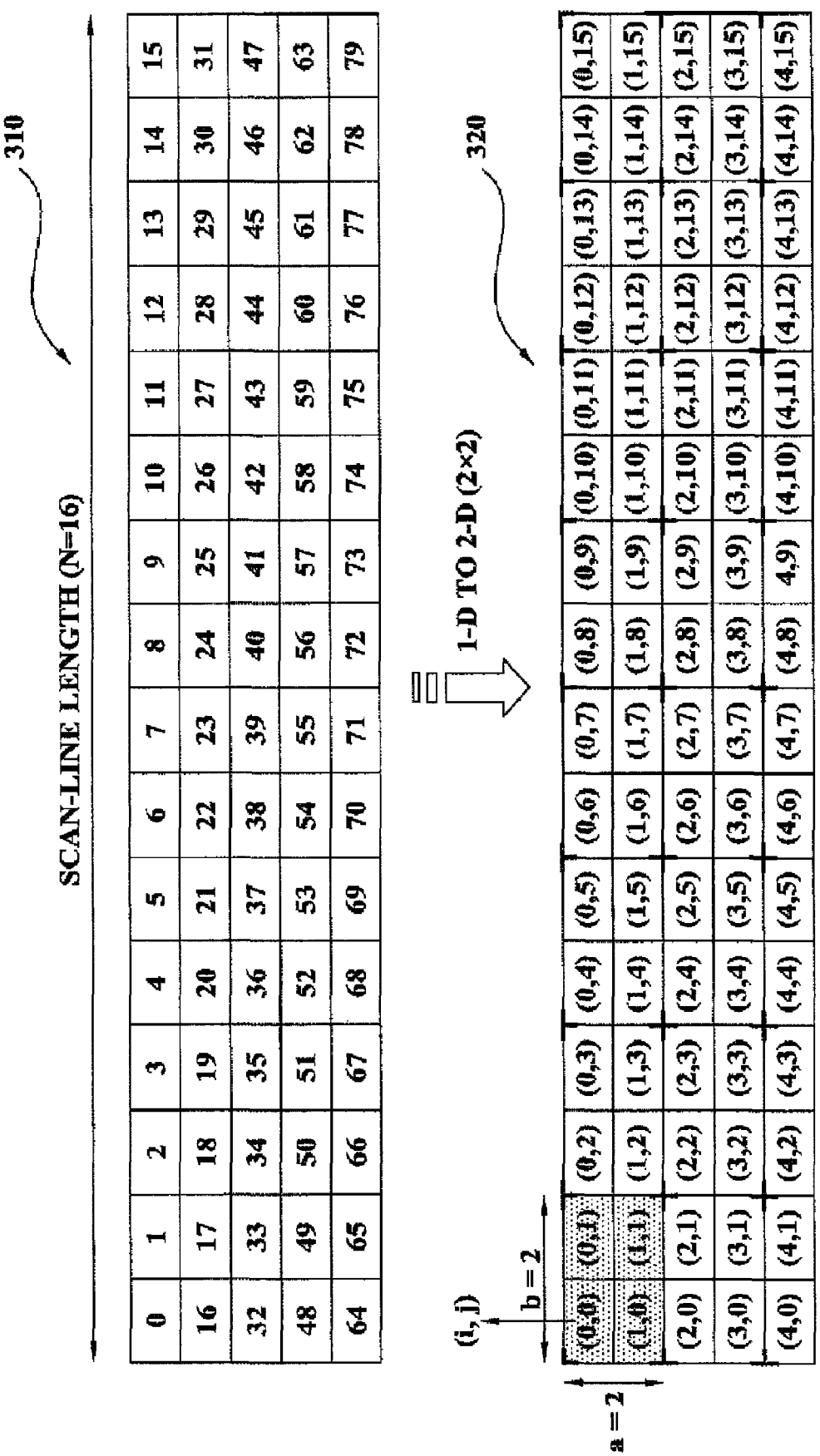
FIG. 3 is a diagram illustrating an operation of mapping a linear address of a memory into a 2-D address according to an exemplary embodiment of the present invention.

FIG. 3 is a diagram illustrating an operation of mapping a linear address of a memory into a 2-D address according to an exemplary embodiment of the present invention.

According to the present exemplary embodiment, the linear address addr of the memory is mapped into the 2-D address (m, n), which is represented as, $$addr \rightarrow (m,n) \quad \text{[Equation 1]}$$

Here, m is a quotient of (addr/L), n is a remainder of (addr/L), and L is a scan-line length of the memory. The scan-line length of the memory indicates a width when interpreting the memory. In FIG. 3, the scan-line length of the memory is 16. Also, in FIG. 3, a 2-D memory 320, represented as the 2-D address (m, n) by virtually converting a 1-D memory 310 represented as the linear address, i.e., 1-D address, into the 2-D address (m, n), is illustrated.

According to the present exemplary embodiment, an inner-most loop variable of a triple loop is i, and a number of values which the inner-most loop variable i may have is a. For example, when an inner-most loop is for (i=0; i<2; i++), the inner-most loop variable is i, and values which the inner-most loop variable i may have are 0 and 1. Accordingly, a, i.e., the number of values which the inner-most loop variable i may have, is 2. Similarly, a middle loop variable of the triple loop is j, and a number of values which the middle loop variable j may have is b. Also, an outer-most loop variable of the triple loop is k, and a number of values which the outer-most loop variable k may have is c. According to the present exemplary embodiment, both a and b are 2. In FIG. 2, memory locations accessed by an inner double loop are aligned and represented in the 2-D memory 320. When the outer-most loop variable has a first value, the 2-D memory 320 accessed by the inner double loop is (0, 0), (0, 1), (1, 0), and (1, 1). Also, when the outer-most loop variable has a second value, the 2-D memory 320 accessed by the inner double loop is (0, 2), (0, 3), (1, 2), and (1, 3).

Figure 4:
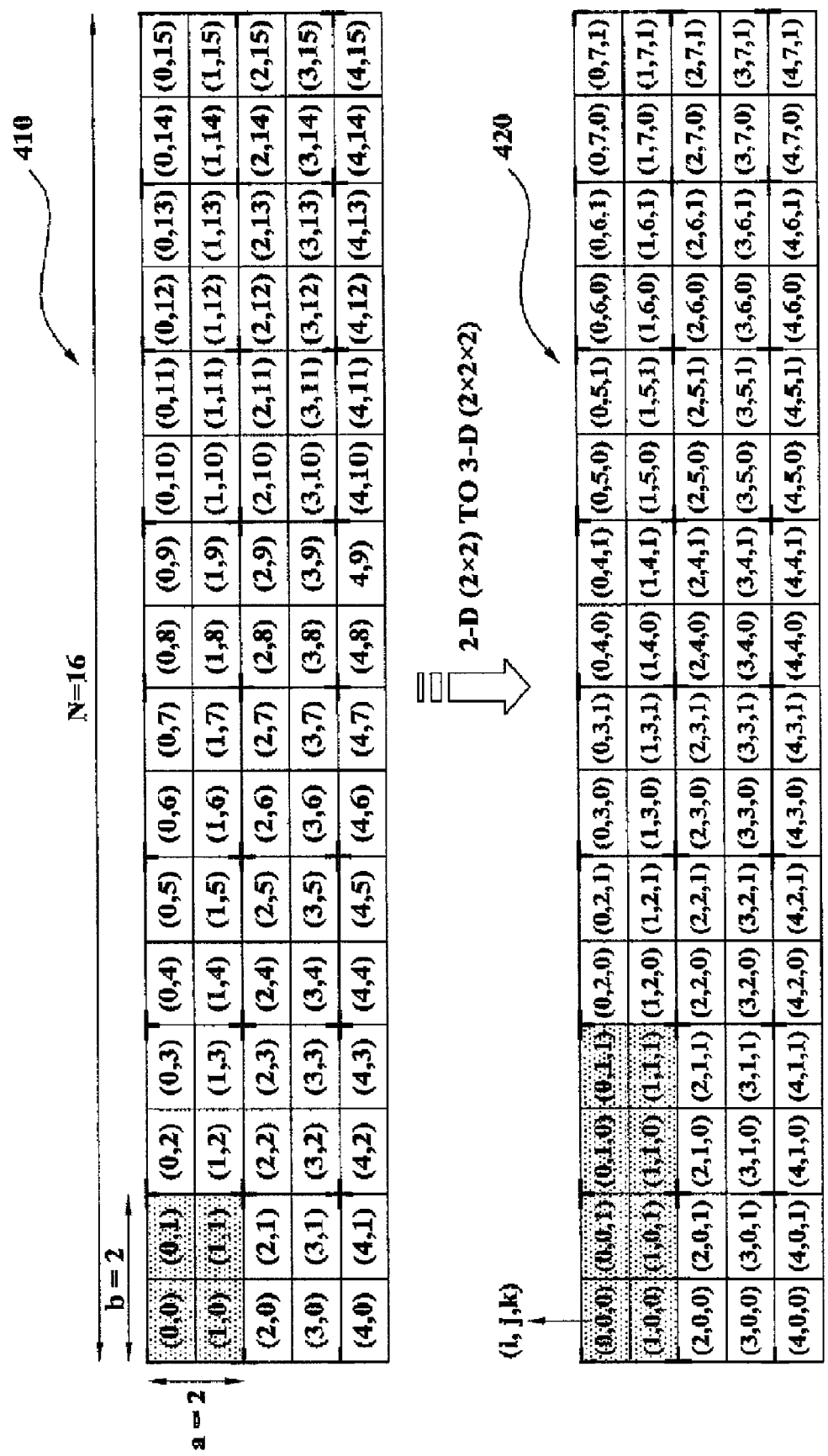
FIG. 4 is a diagram illustrating an operation of mapping a 2-D address of a memory into a 3-D address according to an exemplary embodiment of the present invention.

FIG. 4 is a diagram illustrating an operation of mapping a 2-D address of a memory into a 3-D address according to an exemplary embodiment of the present invention.

According to the present exemplary embodiment, the 2-D address (m, n) mapped from the linear address addr of the memory is virtually mapped into a 3-D address (x, y, z), which is represented as, $$(m,n) \rightarrow (x,y,z) \quad \text{[Equation 2]}$$

Here, x is the same as m, y is a quotient of (n/a), z is a remainder of (n/a), and a is a number of values which an inner-most loop variable of a triple loop may have. A memory 420, represented as the 3-D address (x, y, z) by virtually converting a memory 410 represented as the 2-D address (m, n) into the 3-D address (x, y, z), is illustrated in FIG. 4. According to the present exemplary embodiment in FIG. 4, a, i.e., the number of values which the inner-most loop variable of the triple loop may have, is 2. Accordingly, a 2-D address (0, 6) is mapped into a 3-D address (0, 3, 0), and a 2-D address (2, 10) is mapped into a 3-D address (2, 5, 0).

Figure 5:
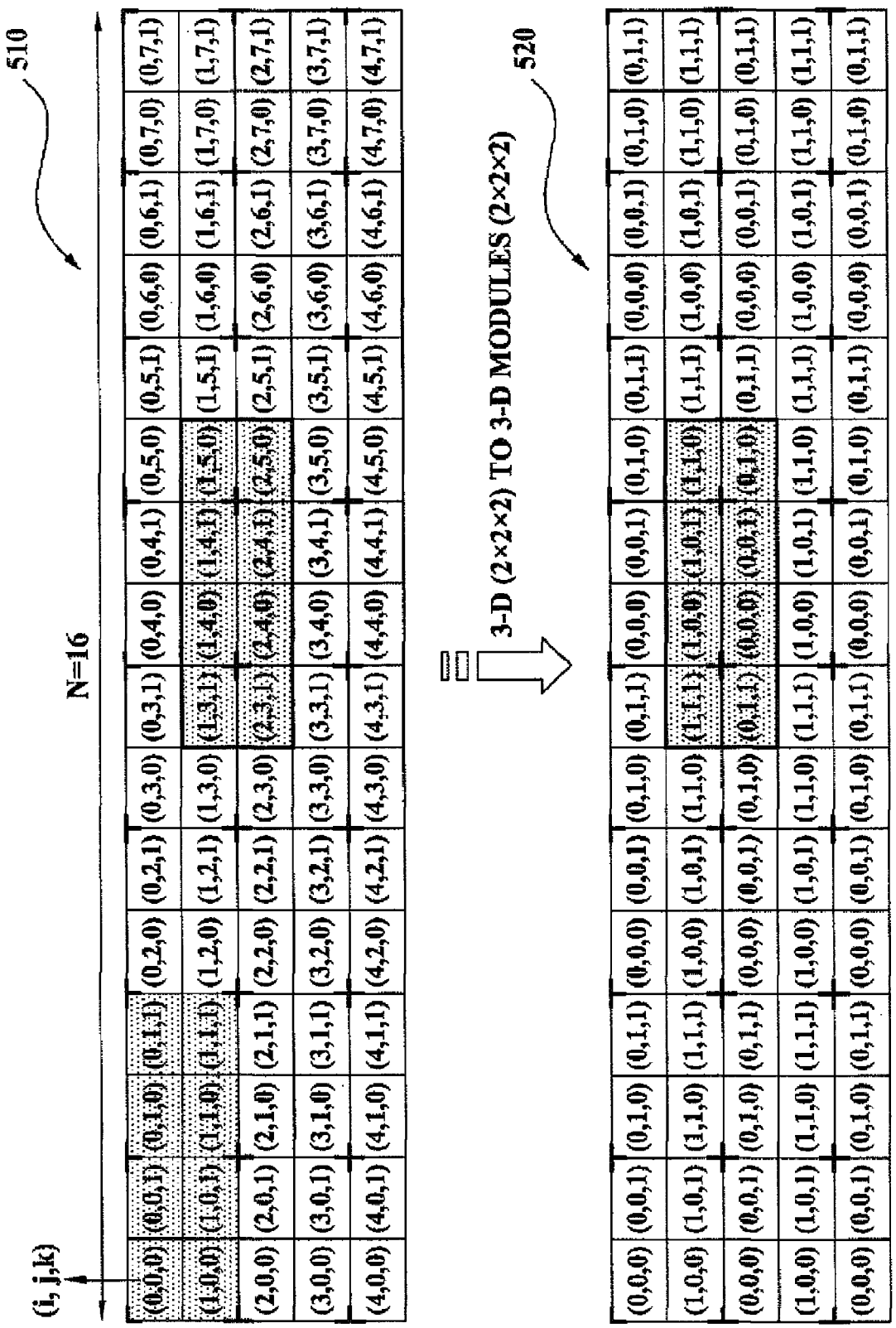
FIG. 5 is a diagram illustrating an operation of mapping a 3-D address of a memory into a 3-D module according to an exemplary embodiment of the present invention.

FIG. 5 is a diagram illustrating an operation of mapping a 3-D address of a memory into a 3-D module according to an exemplary embodiment of the present invention.

According to the present exemplary embodiment, the 3-D address (x, y, z) is mapped into the 3-D module (p, q, r), which is represented as, $$(x,y,z) \rightarrow (p,q,r) \quad \text{[Equation 3]}$$

Here, p=x mod a, q=y mod b, r=z mod c, a is a number of values which an inner-most loop variable of a triple loop may have, b is a number of values which a middle loop variable of the triple loop may have, and c is a number of values which an outer-most loop variable of the triple loop may have.

A memory 520, represented as the 3-D module (p, q, r) by mapping a memory 510 represented as the 3-D address (x, y, z) into the 3-D module (p, q, r), is illustrated in FIG. 5. According to the present exemplary embodiment, in FIG. 5, a, i.e., the number of values which the inner-most loop variable of the triple loop may have, is 2. Also b, i.e., the number of values which the middle loop variable of the triple loop may have, is 2, and c, i.e., the number of values which the outer-most loop variable of the triple loop may have, is 2. Accordingly, in FIG. 5, a 3-D address (0, 2, 0) is mapped into a 3-D module (0, 0, 0), and a 3-D address (3, 4, 0) is mapped into a 3-D module (1, 0, 0).

FIGS. 6A and 6B are diagrams illustrating an operation of generating a 3-D module array according to an exemplary embodiment of the present invention.

According to the present exemplary embodiment, the 3-D module array (p, q, r) is generated using a generated 3-D module (p, q, r). The 3-D module array (p, q, r) includes addresses which are mapped into the 3-D module (p, q, r), and the addresses are sorted sequentially. FIGS. 6A and 6B illustrate a portion of the 3-D module array (p, q, r) generated using a mapped 3-D module (p, q, r) illustrated in FIG. 5.

FIG. 6A illustrates a 3-D module array (0, 0, 0). The 3-D module array (0, 0, 0) includes addresses which are mapped into a 3-D module (0, 0, 0), and the addresses are sorted sequentially. The addresses may correspond to linear addresses, i.e., 1-D addresses, 2-D addresses, or 3-D addresses. In FIG. 6A, the addresses are the 3-D addresses. Referring to FIG. 5, 3-D addresses mapped into the 3-D module (0, 0, 0) are (0, 0, 0), (0, 2, 0), (0, 4, 0), (0, 6, 0), and the like. When represented as the 2-D addresses, 2-D addresses mapped into the 3-D module (0, 0, 0) are (0, 0), (0, 4), (0, 8), (0, 12), and the like. When represented as the 1-D addresses, 1-D addresses mapped into the 3-D module (0, 0, 0) are 0, 4, 8, 12, and the like.

FIG. 6B illustrates a 3-D module array (0, 1, 1). The 3-D module array (0, 1, 1) includes addresses which are mapped into a 3-D module (0, 1, 1), and the addresses are sorted sequentially. Referring to FIG. 5, 3-D addresses mapped into the 3-D module (0, 1, 1) are (0, 1, 1), (0, 3, 1), (0, 5, 1), (0, 7, 1), and the like.

Figure 7:
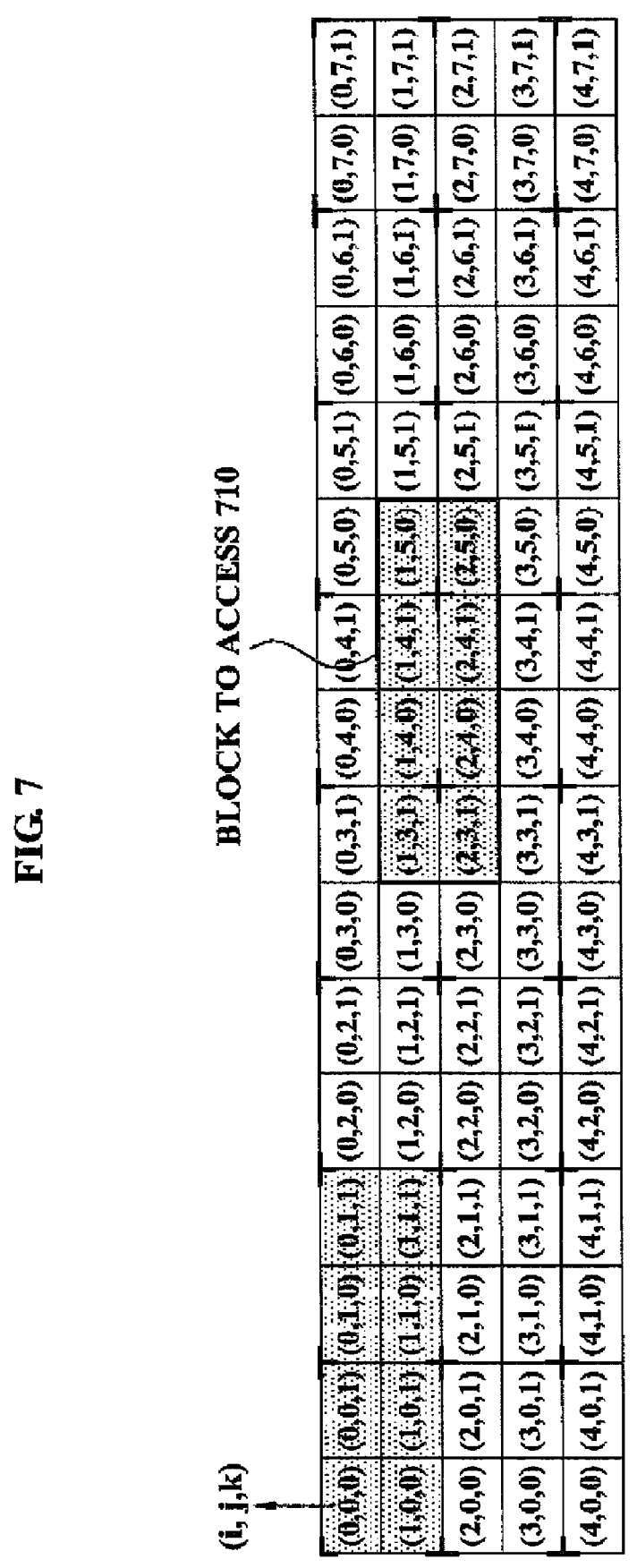

FIG. 7 is a diagram illustrating an operation of obtaining an address of a memory block accessed by a triple loop according to an exemplary embodiment of the present invention.

A starting address of a memory accessed by the triple loop is mapped into a 3-D address. Since the starting address of the memory accessed by the triple loop is a linear address, an operation of mapping the linear address into the 3-D address is performed using Equation 1 and Equation 2. For example, in FIGS. 3 and 4, when the starting address of the memory accessed by the triple loop is 23, an 1-D address, i.e., the linear address 23, is mapped into a 3-D address (1, 3, 1) using Equation 1 and Equation 2.

An a×b×c block is accessed using following Equation 4. Here, a is a number of values which an inner-most loop variable of the triple loop may have, b is a number of values which a middle loop variable of the triple loop may have, and c is a number of values which an outer-most loop variable of the triple loop may have. L is a scan-line length of the memory.

$$A_{p,q,r}(x1, y1, z1) = \qquad \text{[Equation 4]}$$
$$(x1\,div\,a + d_{x1}) \times \frac{L}{b \cdot c} + y1\,div\,b + d_{y1} + d_{z1}$$
$$d_{x1} = \begin{cases} 1 & (x1\,\bmod a) > p \\ 0 & \text{otherwise} \end{cases}$$
$$d_{y1} = \begin{cases} 1 & (y1\,\bmod b) > q \\ 0 & \text{otherwise} \end{cases}$$
$$d_{z1} = \begin{cases} 1 & (2^{z1}\,\bmod c) > r \\ 0 & \text{otherwise} \end{cases}$$

Here, (x1, y1, z1) is an initial 3-D address of the a×b×c block. $A_{p,q,r}(x1, y1, z1)$ corresponds to a value of where an address mapped into a 3-D module (p, q, r) in the a×b×c block is located in a 3-D module array (p, q, r). In this instance, the a×b×c block has (x1, y1, z1) as the 3-D address of the starting address. Specifically, when $A_{p,q,r}(x1, y1, z1)$ has a value of f, the address mapped into the 3-D module (p, q, r) in the a×b×c block, which has (x1, y1, z1) as the 3-D address of the starting address, corresponds to a value of $(f+1)^{th}$ in the 3-D module array (p, q, r).

According to the present exemplary embodiment, in FIG. 7, the number of values which the inner-most loop variable of the triple loop in a program may have, the number of values which the middle loop variable of the triple loop in the program may have, and the number of values which the outer-most loop variable of the triple loop in the program may have are all 2. Also, it is assumed that the initial 3-D address of the a×b×c block is a 3-D address (1, 3, 1). The 3-D address (1, 3, 1) is mapped into the starting address of the memory accessed by the triple loop, i.e., 23. Accordingly, memories which are mapped into a 2×2×2 block may be ascertained through $A_{p,q,r}(x1, y1, z1)$. In this instance, the 2×2×2 block starts with the starting address 23, and when the starting address 23 is mapped into the 3-D address, the 3-D address is (1, 3, 1). Also, the $A_{p,q,r}(x1, y1, z1)$ is computed by substituting (0, 0, 0), (0, 0, 1), (0, 1, 0), (0, 1, 1), (1, 0, 0), (1, 0, 1), (1, 1, 0), and (1, 1, 1) into the 3-D module (p, q, r).

For example, in FIG. 7, the 3-D address of the starting address, (x1, y1, z1) in a block to access 710 is (1, 3, 1), which is described above. According to the present exemplary embodiment, the number of values which the inner-most loop variable of the triple loop in the program may have, a, the number of values which the middle loop variable of the triple loop in the program may have, b, and the number of values which the outer-most loop variable of the triple loop in the program may have, c are all 2. L is the scan-line length of the memory, and is 16 according to the present example of the present exemplary embodiment in FIG. 7. According to the present exemplary embodiment, when substituting (0, 1, 1) into the 3-D module (p, q, r) using Equation 4, $A_{0,1,1}(1, 3, 1)=(0+1)\times 4+1+0+0=5$ is obtained. Specifically, an address mapped into the 3-D module (0, 1, 1) in the 2×2×2 block, which has (1, 3, 1) as the 3-D address of the starting address, corresponds to $6^{th}$ (i.e., 5+1) in a 3-D module array (0, 1, 1). Referring to FIG. 6B, a sixth element in the 3-D module array (0, 1, 1) is a memory whose 3-D address is (2, 3, 1).

Similarly, when substituting (0, 0, 0) into the 3-D module (p, q, r) using Equation 4, $A_{0,0,0}(1, 3, 1)=(0+1)\times 4+1+1+0=6$ is obtained. Specifically, an address mapped into the 3-D module (0, 0, 0) in the 2×2×2 block, which has (1, 3, 1) as the 3-D address of the starting address, corresponds to $7^{th}$ (6+1) in a 3-D module array (0, 0, 0). Referring to FIG. 6A, a seventh element in the 3-D module array (0, 0, 0) is a memory whose 3-D address is (2, 4, 0).

Particularly, although the block to access 710 is not aligned in FIG. 7, the block to access 710 is accessed as a single block according to the present exemplary embodiment. Specifically, according to the present exemplary embodiment, the memory accessed by the triple loop may be accessed by a block unit regardless of an alignment of the memory.

Figure 8:
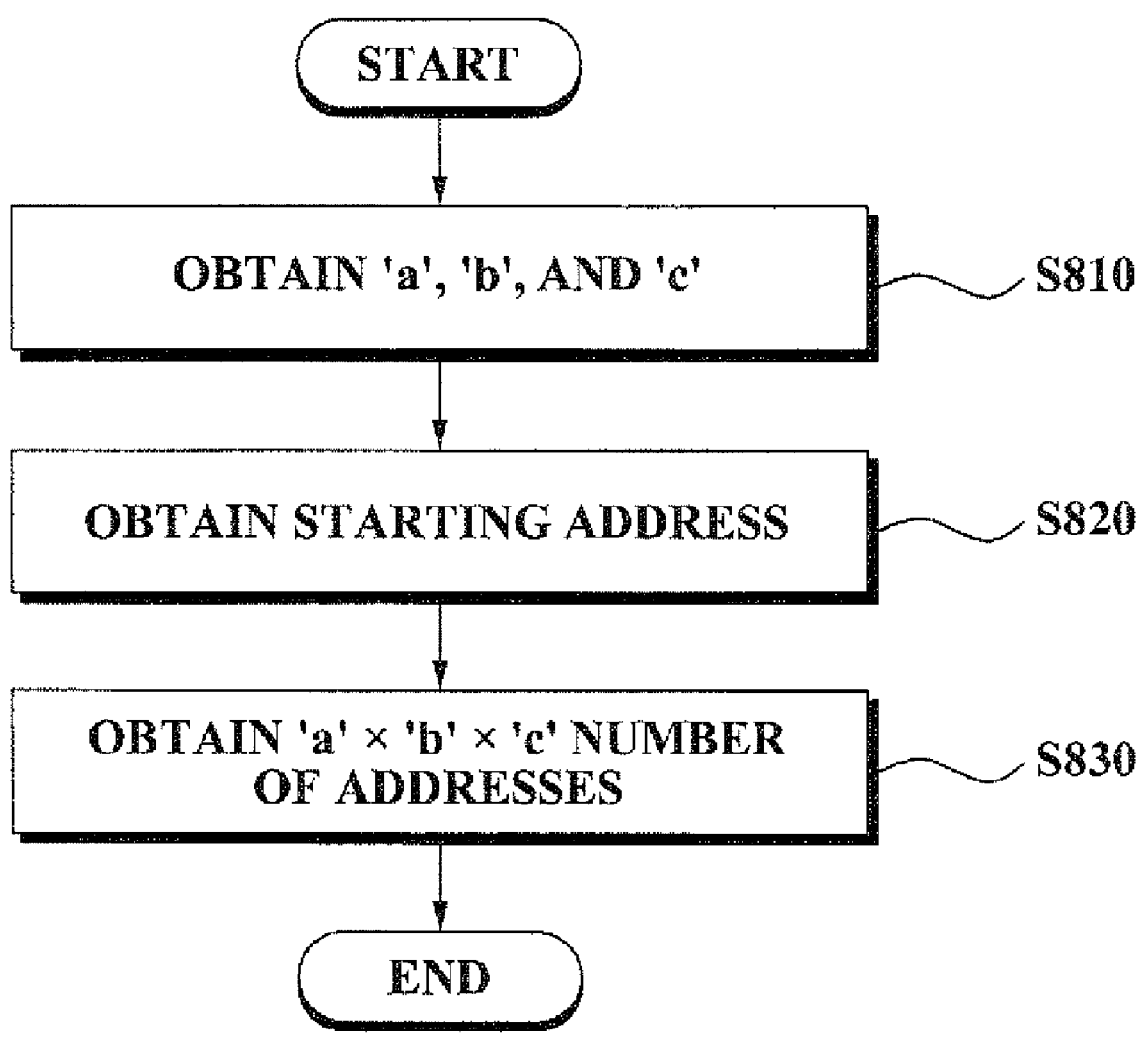
FIG. 8 is a flowchart illustrating a method of obtaining an address of a memory accessed by a triple loop according to an exemplary embodiment of the present invention.

FIG. 8 is a flowchart illustrating a method of obtaining an address of a memory accessed by a triple loop according to an exemplary embodiment of the present invention.

In operation S810, a program code for accessing a memory with the triple loop in a program is identified. For example, referring to FIG. 2, the program code for accessing the memory with the triple loop including a loop 230, a loop 220, and a loop 210 is identified from a program described with reference to FIG. 2. Also, in operation S810, a, b, and c are obtained. In this instance, a is a number of values which an inner-most loop variable of the triple loop may have, b is a number of values which a middle loop variable of the triple loop may have, and c is a number of values which an outer-most loop variable of the triple loop may have. Referring to the program described with reference to FIG. 2, the inner-most loop variable of the triple loop including the loop 230, the loop 220, and the loop 210 is i, and the number of values which the inner-most loop variable i may have is 8. The middle loop variable of the triple loop is j, and the number of values which the middle loop variable j may have is 8. Also, the outer-most loop variable of the triple loop is k, and the number of values which the outer-most loop variable k may have is 2. When an inner-most loop is provided as for (i=0; i<8; i=i+3), values which the inner-most loop variable i may have are 0, 3, 6. Accordingly, the number of values which the inner-most loop variable i may have is 3.

In operation S820, a starting address of the memory accessed by the triple loop is obtained. In the program described with reference to FIG. 2, the starting address of the memory accessed by the triple loop is an address corresponding to a[0][0][0].

In operation S830, an a×b×c number of addresses of the memory accessed by the triple loop is obtained using the starting address and a function. For this, a linear address of the memory is mapped into a 3-D address, and a 3-D module array is computed based on the 3-D address, which has been described with reference to FIGS. 3, 4, 5, 6A, and 6B. Also, a 3-D address (x, y, z) mapped into the starting address is obtained from the starting address. Also, addresses of the memory included in an a×b×c block whose starting address is the 3-D address (x1, y1, z1) are obtained by using the function, i.e., Equation 4, with respect to all possible combinations of p, q, and r. Here, 0<=p<c, 0<=q<b, 0<=r<c.

Figure 9:
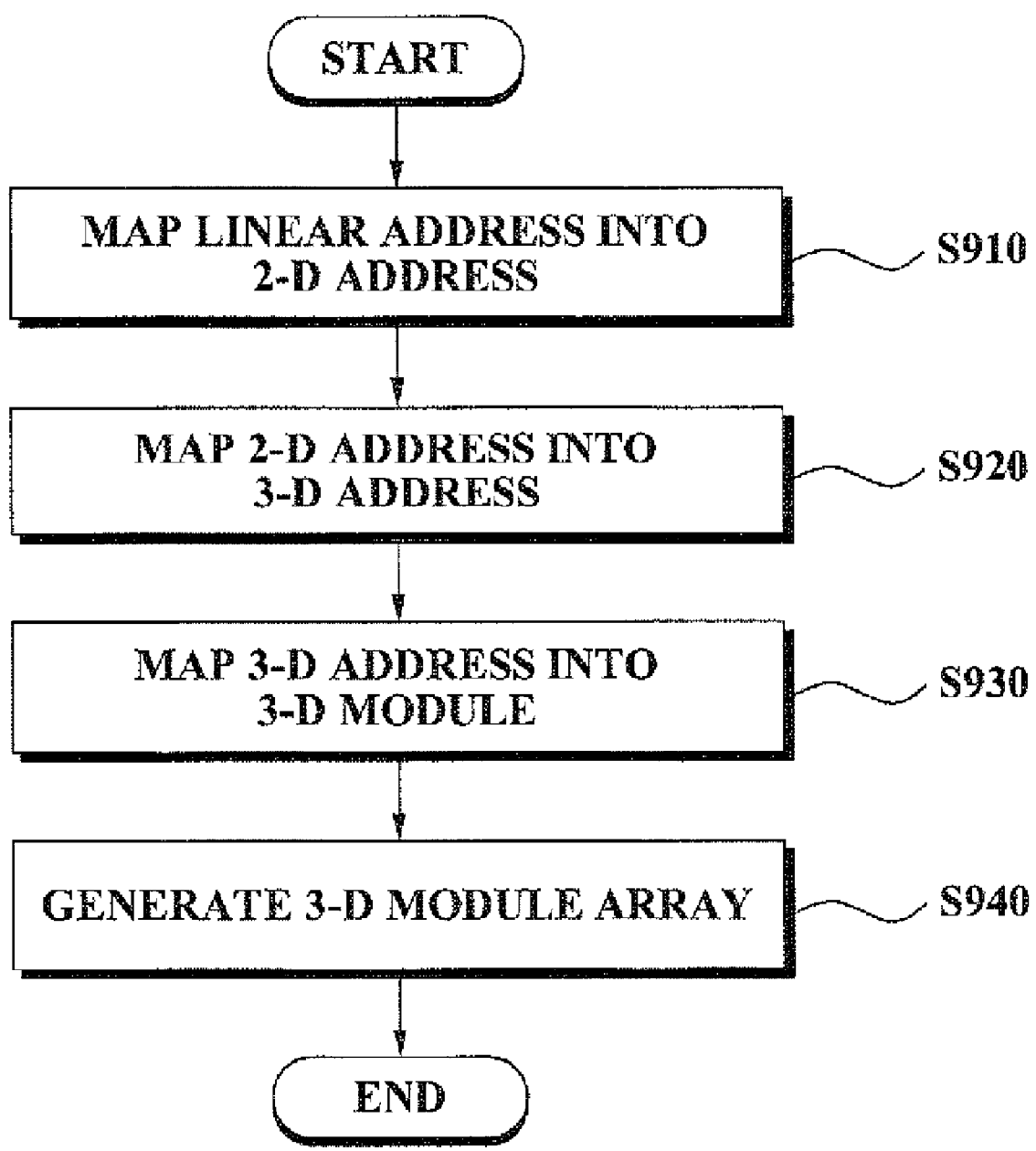
FIG. 9 is a flowchart illustrating a method of virtually mapping a linear addressable memory (LAM) into a 3-D addressable memory (3-DAM) according to an exemplary embodiment of the present invention.

FIG. 9 is a flowchart illustrating a method of virtually mapping a linear addressable memory (LAM) into a 3-D addressable memory (3-DAM) according to an exemplary embodiment of the present invention.

In operation S910, a linear address addr of a memory is mapped into a 2-D address (m, n), which is given by Equation 1 described with reference to FIG. 3.

In operation S920, the 2-D address (m, n) is mapped into a 3-D address (x, y, z), which is given by Equation 2 described with reference to FIG. 4. Accordingly, the linear address addr of the memory is mapped into the 3-D address (x, y, z).

In operation S930, the 3-D address (x, y, z) is mapped into a 3-D module (p, q, r), which is given by Equation 3 described with reference to FIG. 5.

In operation S940, a 3-D module array (p, q, r) which includes addresses mapped into the 3-D module (p, q, r) is generated, which has been described with reference to FIG. 6. In this instance, the addresses are sorted sequentially.

The memory access method using the 3-D address mapping method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as a read-only memory (ROM), a random access memory (RAM), a flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 10:
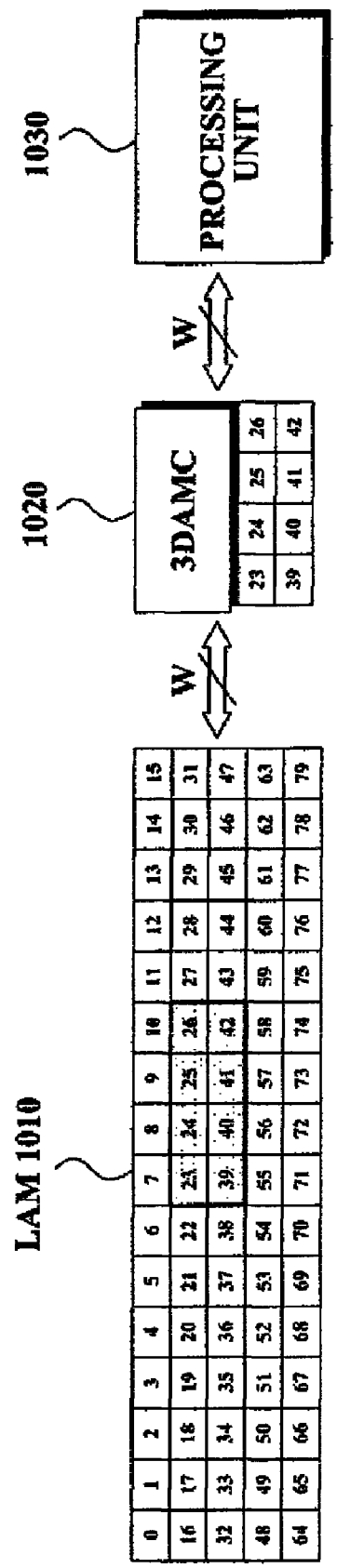
FIG. 10 is a diagram illustrating an operation of a 3-D accessible memory controller (3DAMC) accessing an LAM using a virtual 3-D address mapping according to an exemplary embodiment of the present invention.

FIG. 10 is a diagram illustrating an operation of a 3-D accessible memory controller (3DAMC) accessing an LAM using a virtual 3-D address mapping according to an exemplary embodiment of the present invention.

The 3DAMC 1020 performing a memory access method according to an exemplary embodiment of the present invention may be embodied as hardware. In this case, the 3DAMC 1020 is located between a processing unit 1030 and the LAM 1010. Also, the 3DAMC 1020 can access a memory by a block with respect to a program code which is accessed by a triple loop, using a 3-D address mapping method, according to an exemplary embodiment of the present invention. An operation performed by the 3DAMC 1020 may be a portion of or entire operations described with reference to FIGS. 8 and 9.

Although it is described with respect to only the triple loop, the present invention may be applied to a loop equal to or greater than a quadruple loop. In this case, the loop equal to or greater than the quadruple loop may efficiently perform a memory access by applying the present invention with respect to an inner triple loop.

According to the exemplary embodiments of the present invention, there is provided a method and apparatus for efficiently accessing a memory accessed by a triple loop included in a program.

According to the exemplary embodiments of the present invention, there is provided a method and apparatus for efficiently mapping a linear address into a 3D address which is suitable for an address computation of a memory accessed by a triple loop.

According to the exemplary embodiments of the present invention, a memory accessed by a triple loop may be accessed by a block unit regardless of an alignment of the memory.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A memory access method, comprising:
obtaining a, b, and c from a program code for accessing a memory with a triple loop in a program, a being a number of values which an inner-most loop variable of the triple loop may have, b being a number of values which a middle loop variable of the triple loop may have, and c being a number of values which an outer-most loop variable of the triple loop may have;
obtaining a starting address of the memory accessed by the triple loop; and
obtaining an a×b×c number of addresses of the memory accessed by the triple loop using the starting address and a function.

2. The memory access method of claim 1, further comprising:
mapping a linear address of the memory into a three-dimensional (3-D) address (x, y, z).

3. The memory access method of claim 2, wherein the mapping comprises:
mapping the linear address of the memory into a two-dimensional (2-D) address (m, n); and
mapping the 2-D address (m, n) into the 3-D address (x, y, z).

4. The memory access method of claim 3, wherein:
m is a quotient of (addr/L);
n is a remainder of (addr/L);
addr is the linear address of the memory; and
L is a scan-line length of the memory.

5. The memory access method of claim 3, wherein:
x=m;
y=a quotient of (n/a); and
z=a remainder of (n/a).

6. The memory access method of claim 2, further comprising:
mapping the 3-D address (x, y, z) into a 3-D module (p, q, r).

7. The memory access method of claim 6, wherein:
p=x mod a;
q=y mod b; and
r=z mod c.

8. The memory access method of claim 6, further comprising:
   generating a 3-D module array, (p, q, r) which comprises addresses which are mapped into the 3-D module (p, q, r), the addresses being sorted sequentially.

9. The memory access method of claim 8, wherein the function is represented as, $$A_{p,q,r}(x1, y1, z1) = (x1 \, div \, a + d_{x1}) \times \frac{L}{b \cdot c} + y1 \, div \, b + d_{y1} + d_{z1}$$

$$d_{x1} = \begin{cases} 1 & (x1 \bmod a) > p \\ 0 & \text{otherwise} \end{cases}$$

$$d_{y1} = \begin{cases} 1 & (y1 \bmod b) > q \\ 0 & \text{otherwise} \end{cases}$$

$$d_{z1} = \begin{cases} 1 & (2^{z1} \bmod c) > r \\ 0 & \text{otherwise} \end{cases}$$

where (x1, y1, z1) is an initial 3-D address of an a×b×c block, and $A_{p,q,r}$(x1, y1, z1) corresponds to a value of where the address mapped into the 3-D module (p, q, r) in the a×b×c block is located in the 3-D module array (p, q, r), the a×b×c block having (x1, y1, z1) as the 3-D address of the starting address.

10. The memory access method of claim 9, wherein the obtaining of the a×b×c number of addresses of the memory comprises:
   obtaining (x1, y1, z1) which is the 3-D address mapped into the starting address of the memory; and
   obtaining addresses of the memory included in the a×b×c block whose starting address is the 3-D address (x1, y1, z1), by using the function, with respect to all possible combinations of p, q, and r, where 0<=p<c, 0<=q<b, 0<=r<c.

11. A three-dimensional (3-D) address mapping method, comprising:
   mapping a linear address of a memory into a two-dimensional (2-D) address (m, n); and
   mapping the 2-D address (m, n) into a 3-D address (x, y, z), wherein
   addr is the linear address of the memory,
   L is a scan-line length of the memory,
   m is a quotient of (addr/L),
   n is a remainder of (addr/L),
   x=m,
   y=a quotient of (n/a),
   z=a remainder of (n/a), and
   a is a number of values which an inner-most loop variable may have.

12. A computer-readable storage medium storing a program for executing a memory access method, the method comprising:
   obtaining a, b, and c from a program code for accessing a memory with a triple loop in a program, a being a number of values which an inner-most loop variable of the triple loop may have, b being a number of values which a middle loop variable of the triple loop may have, and c being a number of values which an outer-most loop variable of the triple loop may have;
   obtaining a starting address of the memory accessed by the triple loop; and
   obtaining an a×b×c number of addresses of the memory accessed by the triple loop using the starting address and a function.

13. The computer-readable storage medium of claim 12, wherein the method further comprises:
   mapping a linear address addr of the memory into a three-dimensional (3-D) address (x, y, z).

14. The computer-readable storage medium of claim 13, wherein the mapping the linear address comprises:
   mapping the linear address of the memory into a two-dimensional (2-D) address (m, n); and
   mapping the 2-D address (m, n) into the 3-D address (x, y, z).

15. The computer-readable storage medium of claim 14, wherein:
   m is a quotient of (addr/L);
   n is a remainder of (addr/L);
   addr is the linear address of the memory; and
   L is a scan-line length of the memory.

16. The computer-readable storage medium of claim 14, wherein:
   x=m;
   y=a quotient of (n/a); and
   z=a remainder of (n/a).

17. The computer-readable storage medium of claim 13, wherein the method further comprises:
   mapping the 3-D address (x, y, z) into a 3-D module (p, q, r).

18. The computer-readable storage medium of claim 17, wherein:
   p=x mod a;
   q=y mod b; and
   r=z mod c.

19. The computer-readable storage medium of claim 13, wherein the method further comprising:
   generating a 3-D module array, (p, q, r) which comprises addresses which are mapped into the 3-D module (p, q, r), the addresses being sorted sequentially.

20. The computer-readable storage medium of claim 19, wherein the function is represented as, $$A_{p,q,r}(x1, y1, z1) = (x1 \, div \, a + d_{x1}) \times \frac{L}{b \cdot c} + y1 \, div \, b + d_{y1} + d_{z1}$$

$$d_{x1} = \begin{cases} 1 & (x1 \bmod a) > p \\ 0 & \text{otherwise} \end{cases}$$

$$d_{y1} = \begin{cases} 1 & (y1 \bmod b) > q \\ 0 & \text{otherwise} \end{cases}$$

$$d_{z1} = \begin{cases} 1 & (2^{z1} \bmod c) > r \\ 0 & \text{otherwise} \end{cases}$$

where (x1, y1, z1) is an initial 3-D address of an a×b×c block, and $A_{p,q,r}$(x1, y1, z1) corresponds to a value of where the address mapped into the 3-D module (p, q, r) in the a×b×c block is located in the 3-D module array (p, q, r), the a×b×c block having (x1, y1, z1) as the 3-D address of the starting address.

21. The computer-readable storage medium of claim 19, wherein the obtaining the a×b×c number of addresses of the memory comprises:
   obtaining (x1, y1, z1) which is the 3-D address mapped into the starting address of the memory; and
   obtaining addresses of the memory included in the a×b×c block whose starting address is the 3-D address (x1, y1, z1), by using the function, with respect to all possible combinations of p, q, and r, where 0<=p<c, 0<=q<b, 0<=r<c.

* * * * *